US007864684B2

(12) United States Patent
Onbeck

(10) Patent No.: US 7,864,684 B2
(45) Date of Patent: Jan. 4, 2011

(54) SCHEDULING STRATEGY FOR PACKET SWITCHED TRAFFIC

(75) Inventor: Sten Onbeck, Göteborg (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 284 days.

(21) Appl. No.: 12/159,725

(22) PCT Filed: Dec. 30, 2005

(86) PCT No.: PCT/EP2005/014136

§ 371 (c)(1),
(2), (4) Date: Jun. 30, 2008

(87) PCT Pub. No.: WO2007/076879

PCT Pub. Date: Jul. 12, 2007

(65) Prior Publication Data

US 2008/0298245 A1 Dec. 4, 2008

(51) Int. Cl.
*H04L 12/26* (2006.01)
(52) U.S. Cl. .................. 370/235.1; 370/229; 370/230; 370/230.1; 370/232; 370/233; 370/235
(58) Field of Classification Search .............. 370/229, 370/230, 230.1, 232, 233, 235, 235.1
See application file for complete search history.

(56) References Cited

U.S. PATENT DOCUMENTS 6,324,165 B1 * 11/2001 Fan et al. ................... 370/232

(Continued)

FOREIGN PATENT DOCUMENTS

EP  1 075 116 A  2/2001

(Continued)

OTHER PUBLICATIONS

3GPP. 3rd Generation Partnership Project, Technical Specification Group GSM/EDGE Radio Access Network; General Packet Radio Seivice (GPRS); Base Station System (BSS)—Serving GPRS Support Node (SGSN); BSS GPRS Protocol (BSSGP) (Release 7) 3GPP TS 48.018 V7.3.0 (Nov. 2005).

*Primary Examiner*—William Trost, IV
*Assistant Examiner*—Toan D Nguyen
(74) *Attorney, Agent, or Firm*—Roger S. Burleigh

(57) ABSTRACT

The invention provides a leaky-bucket method for delivering packets from a first node (A) to a second node (B) in a packet switched network, comprising the steps of: receiving at the first node (A) of at least one transmission comprising buffered packets, and at least one transmission comprising real-time packets; transmitting the received packets to the second node (B) and increase a bucket counter for the bucket, which bucket has a leak rate that is equal to or larger than the byte transmitting ratio of the real-time packets. The method is particularly characterize in that: the bucket size for the buffered packets is set to a first size; the bucket size for real-time packets is set to a second size that is larger than the first bucket size; real-time packets are transmitted to the second node (B) upon arrival at the first node (A), provided that a bucket counter indicates that the second bucket size is not overflowed; buffered packets are transmitted to the second node (B) when the bucket counter indicates that it has leaked enough to receive a buffered packet without overflowing said first bucket size. The invention is also providing an improved node arranged to perform the improved method for a leaky-bucket.

12 Claims, 6 Drawing Sheets

U.S. PATENT DOCUMENTS

| | | | |
|---|---|---|---|
| 7,382,727 B2 * | 6/2008 | Yang | 370/232 |
| 7,430,190 B2 * | 9/2008 | Luo et al. | 370/334 |
| 7,467,223 B2 * | 12/2008 | Wu et al. | 709/238 |
| 2005/0073997 A1 * | 4/2005 | Riley et al. | 370/352 |

FOREIGN PATENT DOCUMENTS

| | | |
|---|---|---|
| WO | WO 03/085903 A | 10/2003 |

* cited by examiner

SCHEDULING STRATEGY FOR PACKET SWITCHED TRAFFIC

TECHNICAL FIELD

The invention is directed to communication networks and in particular to communication via packet switched networks.

BACKGROUND OF THE INVENTION

A packet switched network is a network in which packets (units of information) are individually routed between nodes over data links, which might be shared by many other nodes. This contrasts with circuit switching, which sets up a dedicated connection between two nodes for their exclusive use during the life time of the connection. Packet switching is utilized to i.a. optimize the use of the bandwidth available in a network, to minimize the transmission latency (i.e. the time it takes for data to pass across the network), and to increase the robustness of the communication.

Basically, in a packet switched network, a set of information (e.g. an ordinary data file) is broken up into smaller groups of data known as "packets". The packets are typically carrying information with regard to their origin, destination and sequence within the information set that is transmitted over the network. This is needed for the re-assembly of the information set at the destination node. Hence, a packet can be perceived as a block of data with address and administrative information attached, which information allows a network of nodes to deliver the data to the destination node, e.g. as in Ipv6 (Internet Protocol version 6). A packet is analogous to a letter sent through the mail with the address written on the outside.

Packets are routed to their destination through the most expedient route (as determined by some routing algorithm). This means that packets traveling between the same two nodes may follow different routes and that a specific route or data connection will usually carry packets from several nodes. Consequently packets sent between a pair of nodes may arrive in an order different from the order in which they were originally sent. In addition, the duration between two successive packets may differ at the sending node and at the receiving node, i.e. two packets may be transmitted with a certain time difference and received with another time difference.

The most well-known use of the packet switching model is probably the Internet. The Internet is a packet-switched network running the protocol "Internet Protocol" (layer 3) over a variety of other network technologies. Here, the Ethernet, X.25 and Frame relay are examples of international standard layer 2 packet switching networks. Recent mobile phone technologies such as the GPRS (General Packet Radio Service) are also employing packet switching. This is opposed to the older GSM (Global System for Mobile Communications) technology which in all essential aspects employs circuit switching.

Standardized packet switched networks are normally required to handle flow control, especially when multiple contexts are transmitted to a certain node or certain nodes. Flow control includes such measures as scheduling according to traffic class, handling of congestions, traffic priority and transfer delay etc.

A traffic class can e.g. be a so-called best-effort class for handling transfer of such information as data files, which typically tolerates buffering and rather large packet delay variations. Another traffic class can be a so-called streaming class for handling transfer of such information as full motion movies, which usually tolerates some buffering and packet delay variations. Still another traffic class can be a class that handles transfer of information that more or less requires emulation of a circuit switched network and which therefore tolerates low or no buffering, packet delay or packet delay variations. The GPRS traffic class Conversational is an example of such a traffic class. Information that tolerates low or no buffering, packet delay and packet delay variations is e.g. voice conversations and video-conferences and similar real-time communication.

As already indicated, a flow control for multiple contexts transmitted over a packet switched network to a certain node or certain nodes must almost without exception be prepared to handle congestion situations, at least if the bandwidth is limited and efficiently utilized. Congestions in a packet switched network are typically handled by buffering of the packets. Buffering is typically applied to all traffic classes, at least to some extent and the packets are usually buffered by involving a so-called leaky-bucket algorithm in a well-known manner.

A leaky-bucket algorithm can be conceptually understood as follows:

Two nodes A and B are typically involved. Packets are preferably arriving in a buffer at node A for a subsequent transmission to a buffer at node B.

Arriving packets are placed in a virtual bucket with a hole in the bottom.

The bucket can queue at most b bytes. A packet that arrives when the bucket is full is handled, e.g. by being discharged or buffered for a later delivery to the bucket, and if necessary the oldest packet in the buffer maybe discharged if the buffer becomes full.

Packets drain through the hole in the bucket into the buffer at node B at a certain leak rate of r bytes per second, thus smoothing traffic bursts.

Node B is preferably informing Node A about the bucket size and the bucket leak rate needed or desired for the functions in node B, and also about the number of bytes actually received by the buffer in node B, which may differ from the number of bytes transmitted from node A, e.g. due to disturbances in the transmission between node A and B.

Typically, the algorithm is used to control the rate at which data is injected into the network, smoothing out "burstiness" in the data rate.

When a bucket according to the above has leaked enough so as to allow a further packet to be sent one of the traffic classes is allowed to send the next packet.

This strategy works reasonably well for most traffic classes, since their corresponding applications use buffering in their internal algorithms and/or admit retransmission of packets being lost or discharged due to congestions or other interference of the transmission.

However, buffering packets is not an option when it comes to traffic classes that more or less require an emulation of a circuit switched network, i.e. traffic classes that tolerates low or no buffering, packet delay or packet delay variations. This is especially so in connection with the GPRS traffic class Conversational, which e.g. transmits such information as VoIP, since buffering will only add to the total network delay and create unnecessary jitter. The human ear and codecs that create speech from IP packets works poorly if the delay is above 300 ms and silent periods will be created if the jitter is too large (i.e. large time difference in packet arrival).

Hence, there is a need for a solution that effectively combines transfer of ordinary packet data with transfer of packet data that more or less require emulation of a circuit switched network.

SUMMARY OF THE INVENTION

The invention provides an improved method for a leaky-bucket that handles a simultaneous transfer of ordinary packet data (real-time packets) and packet data that more or less require emulation of a circuit switched network (real-time packets). The invention is also providing an improved network node arranged to perform the improved method for a leaky-bucket.

This is accomplished by a leaky-bucket method for delivering packets from a first node A to a second node B in a packet switched network, comprising the steps of:
  receiving at the first node A of at least one transmission comprising buffered packets, and at least one transmission comprising real-time packets;
  transmitting the received packets to the second node B and increase a bucket counter for the bucket, which bucket has a leak rate that is equal to or larger than the byte transmitting ratio of the real-time packets.

The method is particularly characterized in that:
  the bucket size for the buffered packets is set to a first size,
  the bucket size for real-time packets is set to a second size that is larger than the first bucket size,
  real-time packets are transmitted to the second node B upon arrival at the first node (A), provided that a bucket counter indicates that the second bucket size is not overflowed.
  buffered packets are transmitted to the second node B when the bucket counter indicates that it has leaked enough to receive a buffered packet without overflowing said first bucket size.

An embodiment of the above leaky-bucket method is characterized in that the second bucket size is set to be at least one real-time packet larger than the first bucket size.

Another embodiment of the above leaky-bucket method is characterized in that the buffered packets are scheduled to be transmitted to the second node B depending on the bucket leak rate, and to be rescheduled after a failed delivery to the bucket, e.g. due to the risk of overflowing the first bucket size.

A further embodiment of the above leaky-bucket method is characterized in that the buffered packets are scheduled to be transmitted to the second node B depending on the bucket leak rate adjusted by the byte transmitting ratio of the real-time packets.

Still another embodiment of the above leaky-bucket method is characterized in that the first node A receives a measure from the second node B, which measure comprises the number of bytes received by the second node B, and the first node A corrects the bucket counter substantially according to this number, provided that the number of bytes is below the first bucket size or above the second bucket size, thereby creating an hysteresis for adjusting the bucket counter in the leaky-bucket method.

An additional embodiment of the above leaky-bucket method is characterized in that the packet switched net is a GPRS network and the first node is an SGSN and the second node is at least one of a BSS, a BSC or a RCN. In an Universal Mobile Telecommunication System (UMTS-system) a Radio Network Controller (RNC) is responsible for the control of a group of Node B(s). Corresponding controllers in a GSM system is referred to as Base Station Controller (BSC) which controls a group of Base Station Transceivers (BTS). Other telecommunication systems may have other types of controllers or nodes for managing a group of access points.

Still another embodiment of the above leaky-bucket method is characterized in that the real-time packets are VoIP packets.

The invention is also accomplished by a first node A being arranged to perform a leaky-bucket method for delivering packets from the first node A to a second node B in a packet switched network, which method comprises the steps of:
  receiving at the first node A of at least one transmission comprising buffered packets, and at least one transmission comprising real-time packets;
  transmitting the received packets to the second node (B) and increase a bucket counter for the bucket, which bucket has a leak rate that is equal to or larger than the byte transmitting ratio of the real-time packets.

The node A is particularly characterized in that it is arranged to perform the steps of:
  setting the bucket size for the buffered packets to a first size,
  setting the bucket size for real-time packets to a second size that is larger than the first bucket size,
  transmitting real-time packets to the second node B upon arrival at the first node A, provided that a bucket counter indicates that the second bucket size is not overflowed.
  transmitting the buffered packets to the second node B when the bucket counter indicates that it has leaked enough to receive a buffered packet without overflowing said first bucket size.

An embodiment of the above node is characterized in that the second bucket size is set to be at least one real-time packet larger than the first bucket size.

Another embodiment of the above node is characterized in that the buffered packets are scheduled to be transmitted to the second node B depending on the bucket leak rate and rescheduled after a failed delivery to the bucket, e.g. due to the risk of overflowing the first bucket size.

Still another embodiment of the above node is characterized in that the buffered packets are scheduled to be transmitted to the second node B depending on the bucket leak rate adjusted by the byte transmitting ratio of the real-time packets.

An additional embodiment of the above node is characterized that the first node A is arranged to receive a measure from the second node B, which measure comprises the number of bytes received by the second node B, and the first node A is arranged to correct the bucket counter substantially according to this number, provided that the number of bytes is below the first bucket size or above the second bucket size, thereby creating an hysteresis for adjusting the bucket counter in the leaky-bucket method.

Still another embodiment of the above node is characterized in that the packet switched net is a GPRS network and the first node is an SGSN and the second node is at least one of a BSS, a BSC or a RCN.

Another embodiment of the above node is characterized in that the real-time packets are VoIP packets.

These and other aspects of the present invention will appear in more detail from the following description of embodiments of thereof.

DETAILED DESCRIPTION OF PREFERRED EMBODIMENTS

First Embodiment

Figure 1:
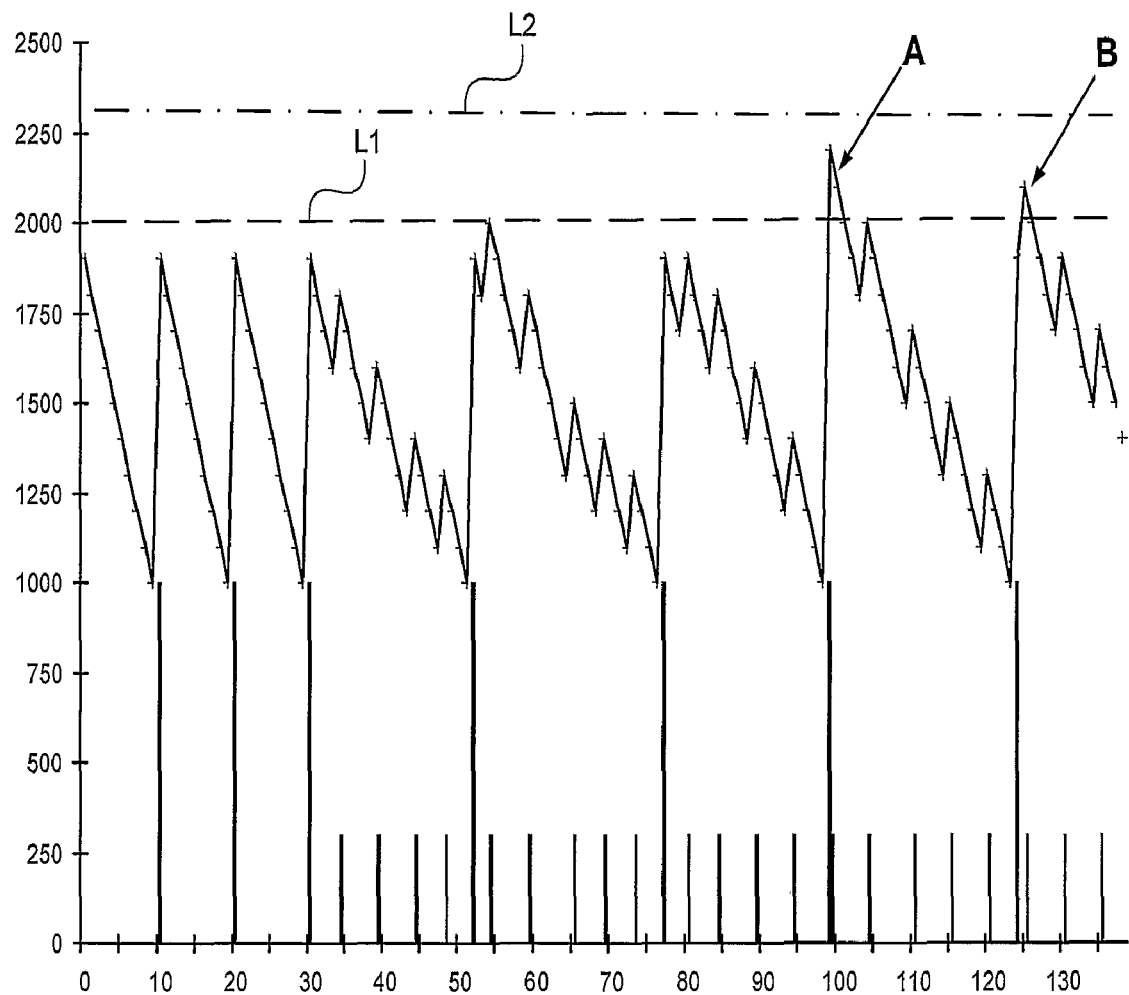
FIG. 1 is a diagram illustrating a transmission according to an embodiment of the present invention of a best-effort context and a real-time context between two nodes in a packet switched network.

FIG. 1 is a diagram schematically illustrating a simplified example of a packet switched transmission, wherein a first context requiring a best-effort transmission and a second context that tolerates low or no buffering, packet delay or packet delay variations are transmitted simultaneously between two nodes in a packet switched network.

Packets transmitted by the context requiring a best-effort transmission will be referred to as "best-effort packets" or buffered packets. Other transmissions that fall under the same category are e.g. contexts that require a streaming transmission. A streaming transmission of e.g. a movie can e.g. start by buffering a number of seconds of movie time in the user equipment before the movie is actually displayed to the user. Packets transmitted by the context that tolerates low or no buffering, packet delay or packet delay variations will be referred to as "real-time packets".

It is assumed that a possible congestion in the exemplifying transmission illustrated in FIG. 1 is handled by means of a leaky-bucket algorithm. However, a token bucket algorithm or other suitable "bucket" algorithms may be conceivable. For the sake of simplicity and for illustrative reasons it is further assumed that the bucket size for the bets-effort packets is set to 2000 byte and that the bucket leak rate is set to 100 byte per second. The best-effort transmission mentioned above is continuously delivering packets comprising 1000 bytes, which means that there are always packets to be delivered to the bucket. However, it should be emphasized that the bucket size and the leak rate can be much larger and possibly even smaller in some applications. A more suitable bucket size for encompassing a transmission of 1000 byte packets may e.g. be 20000-100000 byte and a suitable leak rate may e.g. be set to match the send ratio or send rate of the packets that are expected to be received by the bucket. The leak rate may e.g. be set to X byte per second if the transmission or transmissions to be handled by the bucket in average delivers or is expected to deliver X bytes per second.

A bucket counter indicates 1900 bytes at the time zero in the diagram in FIG. 1. This means that the leak rate of 100 bytes per second causes the bucket counter to indicate 1000 bytes 9 seconds later. This permits a 1000 byte best-effort packet to be delivered to the bucket at 9 seconds or at least at 10 seconds. This has been illustrated by a vertical bar in FIG. 1. The delivery causes the bucket counter to once again indicate 1900 bytes and the leak rate of the bucket will once again cause the bucket counter to indicate 1000 bytes at 19 seconds, which permits a second 1000 byte best-effort packet to be delivered to the bucket at 19 seconds or at least at 20 seconds. This is repeated at 30 seconds, as illustrated by a third vertical bar in FIG. 1.

The first three best-effort packets as discussed above arrive with the same intervals of 10 seconds. However, it should be understood that best-effort packets in a packet switched network may arrive in bursts and time intervals may fluctuate between packets in a burst and between the different burst.

Since we are operating near the limit of the bucket size in FIG. 1 a further 1000 byte packet arriving during the first 30 seconds cannot be received by the leaky-bucket, since the bucket would then overflow. If a further 1000 byte packet arrives nevertheless this can be handled by discharging the packet. It can alternatively be handled by buffering the packet for a later delivery to the bucket and possibly by discharging the oldest packet in the buffer if the buffer becomes full.

A retransmission of a discharged packet may e.g. be demanded when the congestion has been sorted out. A retransmission can be satisfactory for a best-effort context as now discussed, wherein the delivery time and timing of the information is less critical. For example, the content of a transmitted file is usually left unaffected by delays and/or retransmissions, since a user of a transmitted and received file is typically fully capable of utilizing the information even if some packets of the file were delayed or retransmitted.

However, at 34 seconds in FIG. 1 a context requiring a real-time transmission starts on the same node that receives the best-effort packets as discussed above. The exemplifying and simplified real-time transmission requires a bandwidth of 60 bytes per second and uses 300 byte packages (2 packages per 10 second). The first real-time packet arrives at 34 seconds, which causes the bucket counter to indicate 1800 bytes. Three more real-time packets arrives; at 39 seconds (bucket counter=1600 bytes), at 44 seconds (bucket counter=1400) and at 48 seconds (bucket counter=1300) and so on as already delivered packets are continuously leaking out from the bucket at a leak rate of 100 byte per second as previously mentioned.

The 300 byte real-time packets are delivered with approximately 5-6 seconds intervals and a further 1000 byte best-effort packets are scheduled to be delivered in between, as will be described more fully later.

However, at 98 seconds the bucket counter indicates that there is 1000 byte resting in the bucket and a 1000 byte best-effort packet can therefore be delivered at 98 seconds or at least at 99 seconds. However, at 99 seconds a 300 byte real-time packet arrives. Assuming that the bucket size is 2000 byte this real-time packet, if it was delivered, would cause the bucket to overflow (900+1000+300=2200 byte). The overflow limit at 2000 bytes has been indicated by a dashed line L1 in FIG. 1 and the overflow point has been indicated by an arrow A. Since we also assume that the real-time context requires an essentially circuit switched connection the real-time packet arriving at 99 seconds cannot be retransmitted or buffered and the packet should therefore be discharged. The same situation occurs when the bucket counter indicates 1000 byte at 124 seconds. Here a 1000 bytes best-effort packet is sent to the bucket at 124 seconds and it is immediately followed by the arrival of a 300 bytes real-time packet at 125 seconds. Since the delivery of the best-effort packet causes the bucket counter to indicate 1900 bytes the subsequent 300 bytes real-time packet would overflow the bucket and the packet should therefore be discharged. The second overflow point has been indicated by an arrow B in FIG. 1.

The exemplifying values underlying the diagram in FIG. 1 are given in the table below.

| Time (sec.) | Packet Switched | Circuit Switched | Leak-Rate | Bucket-Counter |
|---|---|---|---|---|
| 0 | 0 | 0 | −100 | 1900 |
| 1 | 0 | 0 | −100 | 1800 |
| 2 | 0 | 0 | −100 | 1700 |
| 3 | 0 | 0 | −100 | 1600 |
| 4 | 0 | 0 | −100 | 1500 |
| 5 | 0 | 0 | −100 | 1400 |
| 6 | 0 | 0 | −100 | 1300 |
| 7 | 0 | 0 | −100 | 1200 |
| 8 | 0 | 0 | −100 | 1100 |
| 9 | 0 | 0 | −100 | 1000 |
| 10 | 1000 | 0 | −100 | 1900 |
| 11 | 0 | 0 | −100 | 1800 |
| 12 | 0 | 0 | −100 | 1700 |
| 13 | 0 | 0 | −100 | 1600 |
| 14 | 0 | 0 | −100 | 1500 |
| 15 | 0 | 0 | −100 | 1400 |
| 16 | 0 | 0 | −100 | 1300 |
| 17 | 0 | 0 | −100 | 1200 |
| 18 | 0 | 0 | −100 | 1100 |
| 19 | 0 | 0 | −100 | 1000 |
| 20 | 1000 | 0 | −100 | 1900 |
| 21 | 0 | 0 | −100 | 1800 |
| 22 | 0 | 0 | −100 | 1700 |
| 23 | 0 | 0 | −100 | 1600 |
| 24 | 0 | 0 | −100 | 1500 |
| 25 | 0 | 0 | −100 | 1400 |
| 26 | 0 | 0 | −100 | 1300 |
| 27 | 0 | 0 | −100 | 1200 |
| 28 | 0 | 0 | −100 | 1100 |
| 29 | 0 | 0 | −100 | 1000 |
| 30 | 1000 | 0 | −100 | 1900 |
| 31 | 0 | 0 | −100 | 1800 |
| 32 | 0 | 0 | −100 | 1700 |
| 33 | 0 | 0 | −100 | 1600 |
| 34 | 0 | 300 | −100 | 1800 |
| 35 | 0 | 0 | −100 | 1700 |
| 36 | 0 | 0 | −100 | 1600 |
| 37 | 0 | 0 | −100 | 1500 |
| 38 | 0 | 0 | −100 | 1400 |
| 39 | 0 | 300 | −100 | 1600 |
| 40 | 0 | 0 | −100 | 1500 |
| 41 | 0 | 0 | −100 | 1400 |
| 42 | 0 | 0 | −100 | 1300 |
| 43 | 0 | 0 | −100 | 1200 |
| 44 | 0 | 300 | −100 | 1400 |
| 45 | 0 | 0 | −100 | 1300 |
| 46 | 0 | 0 | −100 | 1200 |
| 47 | 0 | 0 | −100 | 1100 |
| 48 | 0 | 300 | −100 | 1300 |
| 49 | 0 | 0 | −100 | 1200 |
| 50 | 0 | 0 | −100 | 1100 |
| 51 | 0 | 0 | −100 | 1000 |
| 52 | 1000 | 0 | −100 | 1900 |
| 53 | 0 | 0 | −100 | 1800 |
| 54 | 0 | 300 | −100 | 2000 |
| 55 | 0 | 0 | −100 | 1900 |
| 56 | 0 | 0 | −100 | 1800 |
| 57 | 0 | 0 | −100 | 1700 |
| 58 | 0 | 0 | −100 | 1600 |
| 59 | 0 | 300 | −100 | 1800 |
| 60 | 0 | 0 | −100 | 1700 |
| 61 | 0 | 0 | −100 | 1600 |
| 62 | 0 | 0 | −100 | 1500 |
| 63 | 0 | 0 | −100 | 1400 |
| 64 | 0 | 0 | −100 | 1300 |
| 65 | 0 | 300 | −100 | 1500 |
| 66 | 0 | 0 | −100 | 1400 |
| 67 | 0 | 0 | −100 | 1300 |
| 68 | 0 | 0 | −100 | 1200 |
| 69 | 0 | 300 | −100 | 1400 |
| 70 | 0 | 0 | −100 | 1300 |
| 71 | 0 | 0 | −100 | 1200 |
| 72 | 0 | 0 | −100 | 1100 |
| 73 | 0 | 300 | −100 | 1300 |
| 74 | 0 | 0 | −100 | 1200 |
| 75 | 0 | 0 | −100 | 1100 |
| 76 | 0 | 0 | −100 | 1000 |
| 77 | 1000 | 0 | −100 | 1900 |
| 78 | 0 | 0 | −100 | 1800 |
| 79 | 0 | 0 | −100 | 1700 |
| 80 | 0 | 300 | −100 | 1900 |
| 81 | 0 | 0 | −100 | 1800 |
| 82 | 0 | 0 | −100 | 1700 |
| 83 | 0 | 0 | −100 | 1600 |
| 84 | 0 | 300 | −100 | 1800 |
| 85 | 0 | 0 | −100 | 1700 |
| 86 | 0 | 0 | −100 | 1600 |
| 87 | 0 | 0 | −100 | 1500 |
| 88 | 0 | 0 | −100 | 1400 |
| 89 | 0 | 300 | −100 | 1600 |
| 90 | 0 | 0 | −100 | 1500 |
| 91 | 0 | 0 | −100 | 1400 |
| 92 | 0 | 0 | −100 | 1300 |
| 93 | 0 | 0 | −100 | 1200 |
| 94 | 0 | 300 | −100 | 1400 |
| 95 | 0 | 0 | −100 | 1300 |
| 96 | 0 | 0 | −100 | 1200 |
| 97 | 0 | 0 | −100 | 1100 |
| 98 | 0 | 0 | −100 | 1000 |
| 99 | 1000 | 300 | −100 | 2200 |
| 100 | 0 | 0 | −100 | 2100 |
| 101 | 0 | 0 | −100 | 2000 |
| 102 | 0 | 0 | −100 | 1900 |
| 103 | 0 | 0 | −100 | 1800 |
| 104 | 0 | 300 | −100 | 2000 |
| 105 | 0 | 0 | −100 | 1900 |
| 106 | 0 | 0 | −100 | 1800 |
| 107 | 0 | 0 | −100 | 1700 |
| 108 | 0 | 0 | −100 | 1600 |
| 109 | 0 | 0 | −100 | 1500 |
| 110 | 0 | 300 | −100 | 1700 |
| 111 | 0 | 0 | −100 | 1600 |
| 112 | 0 | 0 | −100 | 1500 |
| 113 | 0 | 0 | −100 | 1400 |
| 114 | 0 | 0 | −100 | 1300 |
| 115 | 0 | 300 | −100 | 1500 |
| 116 | 0 | 0 | −100 | 1400 |
| 117 | 0 | 0 | −100 | 1300 |
| 118 | 0 | 0 | −100 | 1200 |
| 119 | 0 | 0 | −100 | 1100 |
| 120 | 0 | 300 | −100 | 1300 |
| 121 | 0 | 0 | −100 | 1200 |
| 122 | 0 | 0 | −100 | 1100 |
| 123 | 0 | 0 | −100 | 1000 |
| 124 | 1000 | 0 | −100 | 1900 |
| 125 | 0 | 300 | −100 | 2100 |
| 126 | 0 | 0 | −100 | 2000 |
| 127 | 0 | 0 | −100 | 1900 |
| 128 | 0 | 0 | −100 | 1800 |
| 129 | 0 | 0 | −100 | 1700 |
| 130 | 0 | 300 | −100 | 1900 |
| 131 | 0 | 0 | −100 | 1800 |
| 132 | 0 | 0 | −100 | 1700 |
| 133 | 0 | 0 | −100 | 1600 |
| 134 | 0 | 0 | −100 | 1500 |
| 135 | 0 | 300 | −100 | 1700 |
| 136 | 0 | 0 | −100 | 1600 |
| 137 | 0 | 0 | −100 | 1500 |
| 138 | 0 | 0 | −100 | 1400 |

In other words, the buffering described above cannot handle situations wherein a real-time packet arrives within a short time after the delivery of a best-effort packet to the bucket, at least not in situations wherein the bucket is operating near the full bucket limit (i.e. near 2000 bytes in the above example). The same is valid for other traffic classes (e.g. a streaming class) being transmitted between two nodes in a packet switched network transmitted together with a traffic class that tolerates low or no buffering, packet delay or packet delay variations.

However, the problem of having to discharge real-time packets in a congestion situation can be solved or at least considerably mitigated by the present invention.

Figure 2:
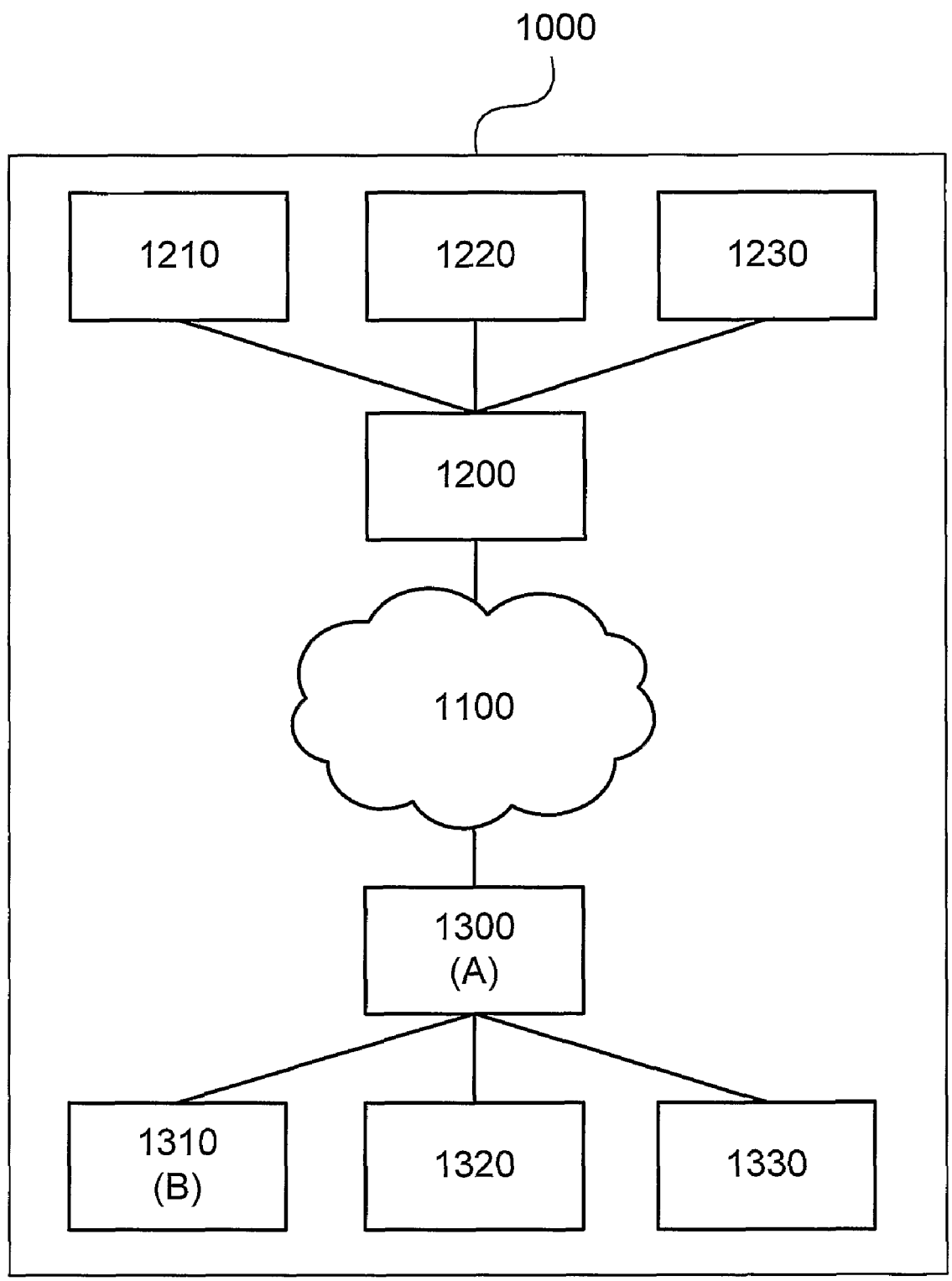
FIG. 2 is an exemplifying schematic packet switched network.

An embodiment of the present invention utilizes a combination of rescheduling and an oversized bucket in a packet switched network e.g. in a packet switched network as the exemplifying packet switched network 1000 shown in FIG. 2.

The exemplifying packet switched network system 1000 in FIG. 2 comprises end-nodes 1210-1230; 1310-1330 being controlled by end-node controllers 1200, 1300 in a packet switched network 1100. The first three end-nodes 1210-1230 are connected to a first end-node controller 1200, and the other three end-nodes 1310-1330 are connected to a second end-node controller 1300. The first end-node controller 1200 is in turn connected to the second end-node controller 1300 via a packet switched network 1100, e.g. a public network such as a Packet Switched Public Data network (PSPDN).

Now, assume that the above discussed context requiring a best-effort transmission corresponds to a transmission between the end-nodes 1210 and 1310 in FIG. 2, and that the context that tolerates low or no buffering, packet delay or packet delay variations corresponds to a transmission between the end nodes 1220 and 1210. The packets from the network 1100, including the packets from the end-nodes 1210 and 1220, are received by the end-node controller 1300. One task of the end-node controller 1300 is then to distribute the packets to the appropriate end-nodes 1310-1330 according to the address and control information comprised by the packets etc as is well known in the art of packet switched networks.

The distributing function of the controller 1300 makes it particularly suitable for handling possible congestions in the end-nodes 1310-1330. Congestions are preferably handled by buffering the packets for a congested end-node 1310-1330 in a buffer arranged in the end node-controller 1300. The buffering may continue until the congestion is resolved or at least temporary resolved or until a decision is taken to handle the packets otherwise, e.g. to discharge the packets and possibly requiring a later retransmission.

Applied to the transmission as discussed above comprising best-effort packets of 1000 byte and real-time packets of 300 byte it is preferred that each end-node 1310-1300 is provided with a buffer that is successively filled from a buffer in the end-node controller 1300 according to a leaky-bucket algorithm as described above.

However, the bucket size accommodating 2000 bytes of best-effort packets is increased in the embodiment now discussed by an amount that corresponds to at least one real-time packet of 300 bytes. The increased amount can only be utilized for real-time packets, meaning that the bucket has two bucket limits, i.e. a first bucket size for best effort packets and a second larger bucket size for real-time packets. This sets the bucket size to at least 2300 bytes (2000+300=2300) for real-time packets. The increased bucket size has been indicated by a dot-and-dashed line L2 in FIG. 1. It can easily be seen that the increased bucket size can accommodate the 300 bytes of real-time packets that would otherwise have been discharged at points A and B in FIG. 1.

In addition, knowing the leak rate (100 bytes per sec) and the value of the bucket counter indicating the current number of bytes in the leaky-bucket enables the leaky-bucket algorithm in the end-node controller 1300 to schedule a suitable time for delivery of a received and buffered best-effort packet without overflowing the bucket. For example, if the end-node controller 1300 has buffered a best-effort packet (1000 bytes) for delivery to the buffer in the end-node 1310 and the bucket counter indicates that there are 2000 bytes in the bucket, then the end-node controller 1300 will schedule a delivery of the packet 10 seconds later (1000/100=10).

In fact, it's a scheduling of this kind that is illustrated by the diagram in FIG. 1. This is particularly evident for the first three best-effort packets delivered at 10, 20 and 30 seconds respectively.

Consequently, the fourth best-effort packet in FIG. 1 is also scheduled for delivery at 40 seconds. However, the real-time context that started at 34 seconds causes the bucket counter to indicate 1500 bytes at 40 seconds and the fourth best-effort packet can therefore not be delivered at 40 seconds without overflowing the bucket. The fourth packet is therefore rescheduled, based on the bucket counter value of 1500 bytes and the leak rate of 100 bytes per second, to be delivered at 45 seconds (2000−1500=500, 1000−500=500; 500/100=5 sec; 40+5=45). However, at 45 seconds the bucket counter indicates 1300 and the fourth packet is rescheduled again to be delivered at 49 seconds (2000−1300=700, 1000−700=300; 300/100=3 sec; 46+3=49). Then once again, at 49 seconds the bucket counter indicates 1200 bytes and the bucket is still to full. The fourth packet is therefore rescheduled to be delivered at 51 seconds (2000−1200=800, 1000−800=200; 200/100=2 sec; 49+2=51). This time the bucket counter indicates 1000 bytes and the fourth best-effort packet can be delivered to the bucket.

The fifth best-effort packet is rescheduled in a similar way with respect to the arriving real-time packets and the known leak rate, and it is subsequently delivered at 99 seconds. However, a 300 bytes real-time packet arrives at the same time. The real-time packet cannot be buffered or otherwise delayed and the packet is therefore delivered to the bucket by the end-node controller 1300. This causes the bucket counter to indicate 2200 bytes and the first bucket size of 2000 bytes for best-effort packets is overflowed. However, the bucket size has been increased to at least 2300 byte for real-time packets and the real-time packet will therefore slip through. A similar situation occurs at 125 seconds. Here a 1000 bytes best-effort packet is delivered to the end-node buffer one second before a 300 bytes real-time packet arrives to the end-node controller 1300, which delivers the packet to the end-node buffer without delay. This causes the bucket counter to indicate 2100 bytes at 125 seconds and the first bucket size of 2000 bytes for best-effort packets is overflowed again, but the real-time packet will slip through nevertheless since the bucket size for real-time packets is set to at least 2300 byte.

The bucket size is preferably increased even further to ensure that a burst of subsequent real-time packets do not overflow the bucket. The leak rate, the size of the packets, the time between two or several subsequent packets in a burst, the number of packets in a burst and the time between two successive burst are parameters that are preferably used to determine the bucket size for the best-effort packets and a suitable increase of that bucket size to accommodate the real-time packets in congestion situations.

For example, the bucket leak rate must be equal to or greater than the send ratio or send rate of the real-time packets, i.e. the leak rate of 100 bytes per second must be greater than the average send rate of 60 bytes per second (300*2/10=60) in the example above.

Second Embodiment

An embodiment of the present invention is directed to a leaky-bucket algorithm with an increased bucket size for real-time packets, and which ignores messages from the receiving node regarding the number of bytes actually received, as long as the number of bytes does not exceed the increased bucket size for real-time packets. This is particularly advantageous in connection with modern telecommunication systems such as the General Packet Radio Service (GPRS) and similar packet switched networks, which handle transmissions that tolerate buffering, packet delay and packet delay variations (e.g. best-effort transmission of files by ftp and/or streaming transmissions of movies), and real-time transmissions that tolerate low or no buffering, packet delay or packet delay variation (e.g. VoIP and video conferences).

Figure 3:
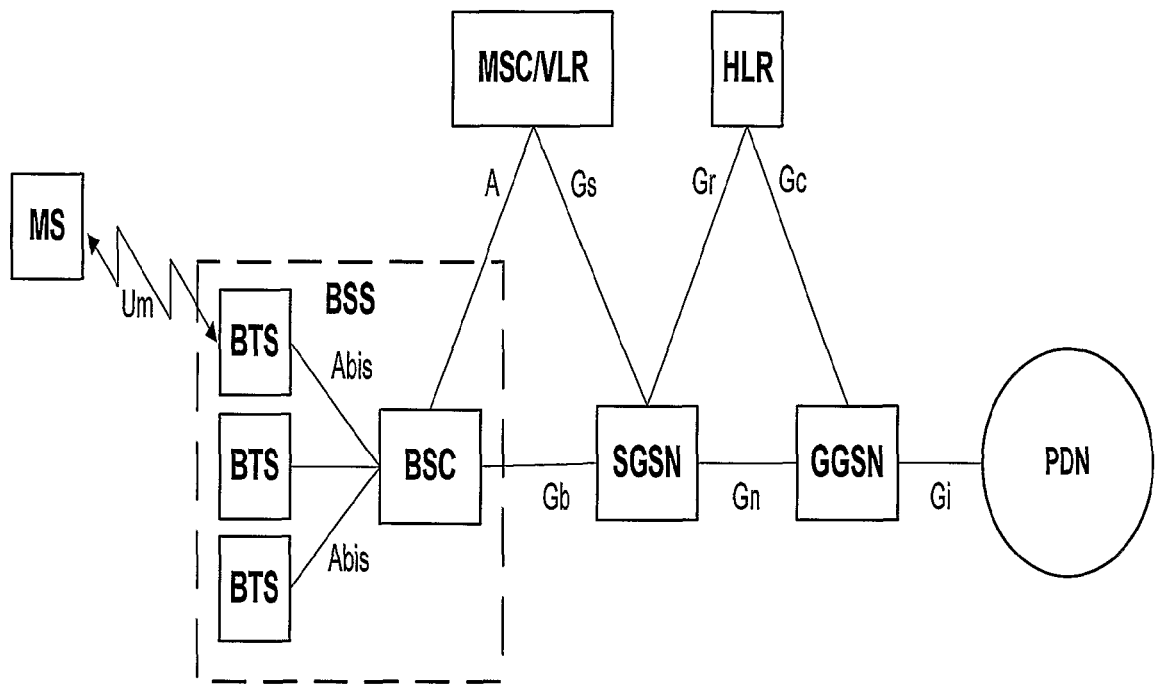
FIG. 3 is an overview of an exemplifying GPRS system architecture

FIG. 3 is an overview of an exemplifying GPRS system. Various network elements and interfaces are shown. The main Core Network (CN) elements in the GPRS network are the Serving GPRS Support Node (SGSN), the Gateway GPRS Support Node (GGSN), and upgraded location registers such as the Visitor Location Register (VLR) and the Home Location Register (HLR). The SGSNs and the GGSNs may be connected directly and/or through intermediate routers and switches to form what is refereed to as the packet switched core network. The CN is used as the interface between the Radio Access Network (RAN) and external data networks such as Public Data Networks (PDNs), e.g. comprising the Internet. The point of contact to external networks is realized through the GGSN, using the Gi interface. SGSN interfaces with the RAN through the Gb interface and provides e.g. mobility management and call signaling functions. The RAN typically comprises one or several Base station Sub-System (BSS), which in turn comprises a Base Station Controller (BSC) connected to a plurality of Base Transmission Stations (BTSs) via an Abis interface. A BTS is in turn serving one or several Mobile Stations (MSs) via an Um air interface. The SGSN maintains signaling connections with the HLR and Mobile Switching Centre (MSC) and the VLR through the Gs, and Gr interfaces, respectively. The GGSN maintains signaling connections with the HLR through the Gc interface. The interconnections between the SGSN and GGSN are implemented through the Gn and the Gp interfaces.

The core network in GPRS can e.g. use the Internet Protocol (IP) as the protocol in the network layer. The protocols used within the transport layer can e.g. be the Internet User Datagram Protocol (UDP) for IP services, and the Internet Transmission Control Protocol (TCP) for services which require delivery guarantee such as X.25 services.

Data transfer between two GPRS Support Nodes (GSN) such as a SGSN and a GGSN or between two SGSNs takes place through a tunneling protocol refereed to as the GPRS Tunneling Protocol (GTP). The GTP encapsulates and carries the Protocol Data Units (PDU) that need to be transported between two GSNs.

Data transfer between a SGSN and a BSS (i.e. BSC) takes place via the Base Station System GPRS Protocol (BSSGP). The primary functions of the BSSGP include:
  Provision by an SGSN to a BSS of radio related information (downlink).
  Provision by a BSS to an SGSN of radio related information (uplink).
  Provision of functionality to enable two physically distinct nodes, an SGSN and a BSS, to operate node management control functions.

The BSSGP is in particular including flow control functions. The basic principle of the BSSGP flow control procedures requires the BSS to send flow control parameters to the SGSN, which allows the SGSN to locally control its transmission output to the BSS. The SGSN may perform flow control on: each BSS GPRS Protocol Virtual Connection (BVC); on each Mobile Station (MS) and optionally on each Packet Flow Context (PFC) for an MS. The BVC flow control corresponds to a flow control with respect to a BSS (i.e. at least one BSC connected to a plurality of BTSs), whereas the MS flow control corresponds to a flow control with respect to a MS (i.e. a single Mobile Station).

The typical flow control parameters sent by the BSS to the SGSN comprises the following information:
  the bucket size (Bmax) for a given BVC or MS or PFC in the downlink direction,
  the bucket leak rate (R) for a given BVC or MS or PFC in the downlink direction,
  the bucket full ratio for a given BVC or MS or PFC in the downlink direction, if the Current Bucket Level (CBL) feature is negotiated.

The above description of the GPRS system corresponds in general to the 3rd Generation Partnership Project (3GPP) standardization and in particularly to the 3GPP TS 48.018 V7.3.0. (2005-11).

In accordance with the second embodiment of the present invention we assume that a best-effort context (e.g. an ftp-session) and a real-time context are transmitted simultaneously from the PDN to the MS via the GGSN and the SGSN in FIG. 3. The real-time context may e.g. be a VoIP transmission or some other context belonging to the GPRS traffic class Conversational.

Figure 4:
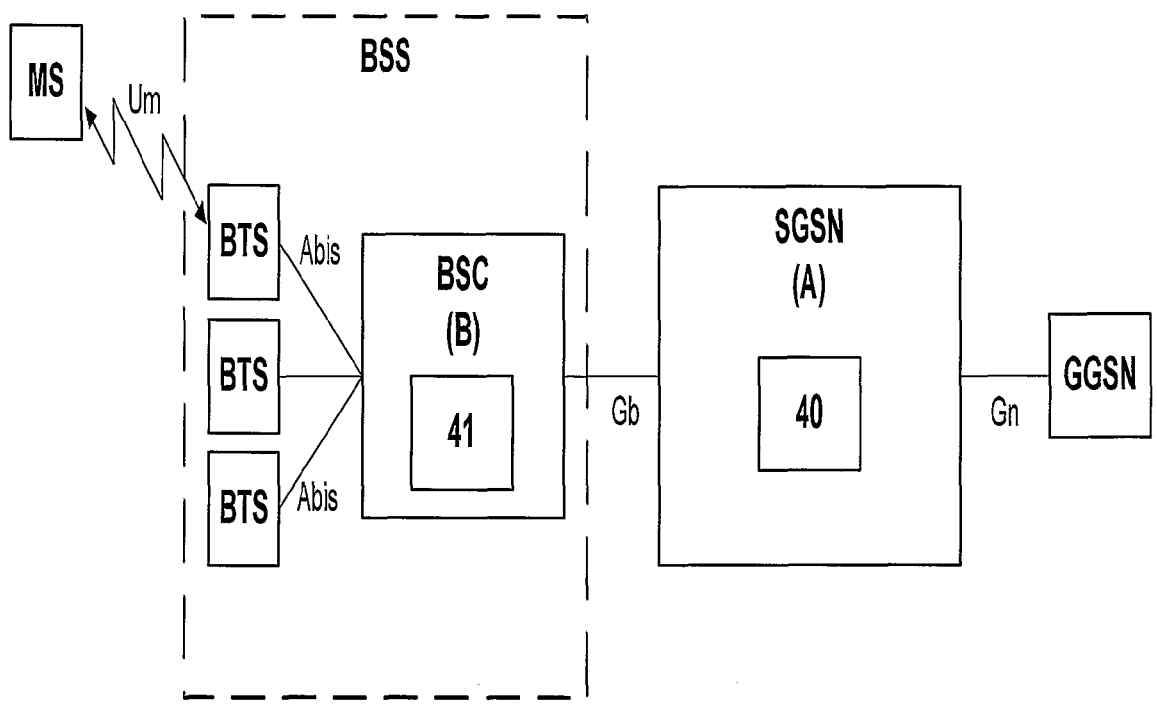
FIG. 4 is a part of the GPRS system in FIG. 3, showing a SGSN-buffer and a BSC-bucket.

A possible congestion in the down link from the SGSN to the BSS is handled by a leaky-bucket algorithm in combination with a buffer 40 arranged in the SGSN and a buffer 41 arranged in the BSC. The SGSN buffer 40 and the BSC buffer 41 are schematically shown in FIG. 4, which illustrates a part of the GPRS system in FIG. 3.

Figure 5:
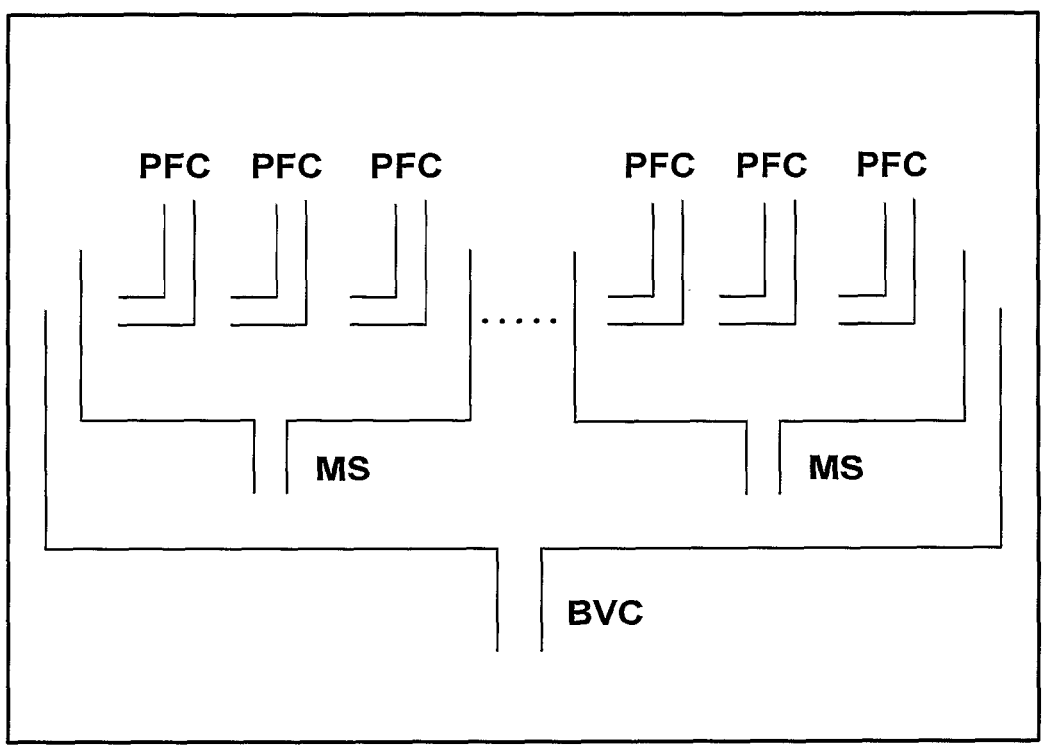
FIG. 5 is a schematic illustration of a bucket arrangement.

An exemplifying bucket arrangement comprising three bucket levels is schematically illustrated in FIG. 5. The BVC-bucket handles flow control for multiple MS on a cell level, the MS-bucket handles flow control for an individual MS in a cell, and the PFC-bucket handles flow-control for a single context on a MS. It is assumed that the above mentioned best-effort packets and real-time packets that are transmitted from the PDN to the MS flow via one or several PFC-buckets into a MS-bucket and further into a BVC-bucket. This is intended to closely comply with the PFC, MS and BVC flow control and bucket arrangement described in the 3GPP TS 48.018 V7.3.0. (2005-11). However, other arrangements are conceivable.

In order to make the SGSN a true part of the IP backbone network, suitable for e.g. VoIP traffic, it is preferred that the SGSN fulfills the following:
  Always prioritizing real-time contexts and classes such as the GPRS Conversational class over other GPRS traffic classes on MS and BVC levels without prior buffering.
  Adding substantially no extra delay for real-time contexts and classes during periods of heavy traffic.
  In addition it is presumed that the BSC buffer 41 is able to handle some amount of MS and/or BVC bucket overfill.

Under these conditions the SGSN can intentionally "overflow" the BVC and/or the MS bucket or buckets, but only for real-time contexts and classes such as the GPRS Conversational.

According to the second embodiment of the present invention it is preferred that the BVC bucket limit is overfilled 1.5 times the bucket size designed to encompass packets for ordinary traffic classes such as best-effort and streaming classes, where the overfill is designated for real-time packets only. It is also preferred that the SGSN scheduling causes all other traffic except signaling to be reduced with the same amount of traffic as the real-time class is using, e.g. the Conversational class.

Regarding the MS bucket it preferred that this bucket is overfilled with as little as 400 bytes for the Conversational class (usually IP packet size for VoIP is below 100 bytes). This ensures that congestion situations that occur on MS level with e.g. streaming or best-effort classes (e.g. transferring of files and/or movies) can be handled by letting the Conversational class step in and take over up to full leak rate without having to buffer the packet or lose any packets. The same is valid mutatis mutandis for the BVC bucket.

The value of 400 byte overflow of the MS bucket has been chosen considering that the typical size of today's VoIP packets is about 100 bytes. This allows for bursts of at least a couple of packets and even allows for future size increases in VoIP packets.

The value of 1.5 times the BVC bucket has been chosen to allow a certain amount of overfill. It is not possible to predict the number of VoIP sessions or other Conversational class transmissions that will be running at the same time on a particular BSS, and it is therefore difficult to anticipate and provide 400 bytes overfill per MS. However, allowing some overflow on the BVC bucket will at least provide a possibility to handle some VoIP traffic for BSCs that operates with a flow control on cell level.

Below is an example of a transmission in a GPRS-system (e.g. as described above) where a buffered best-effort context (e.g. a file transfer) is mixed with a real-time context (e.g. VoIP) complying with the fact that the real-time context cannot be buffered. The example is described with reference to FIGS. 6-9.

Assumptions:
MS Bucket size 3000 byte.
MS Bucket Leak rate 1500 byte per second.

A best-effort session/context is transferring 1500 byte IP packets (e.g. an ftp transfer from a PDN, c.f. FIG. 3), which packets are received and buffered by the SGSN. This means that we always have a number of 1500 byte packages for delivery to the MS bucket, i.e. to the buffer in the BSC.

It is also assumed that the most recently delivered 1500 byte best-effort packet was delivered at 2.00 seconds and that a real-time session/context starts on the same mobile (MS) at 2.91 seconds. The real-time context requires a bandwidth of 1200 in leak rate and uses 120 byte packages (10 packages per sec). Packet one arrives at 2.91 seconds.

Before we proceed it should be emphasized that the bucket size and the leak rate has been chosen primarily for explanatory and illustrative reasons. They can be larger and possibly even smaller in some embodiments. A more suitable bucket size for encompassing a transmission of 1500 byte best-effort packets may e.g. be 20000-100000 byte. It should also be emphasized that the leak-rate and the bucket size may be changed, e.g. due to deteriorating or improving signaling conditions in the radio link between the BTS and the MS in question, or due to due to deteriorating or improving signaling conditions between the SGSN and the BSS (BSC).

The table below illustrates a number of exemplifying values for the MS bucket counter before and after a delivery of best-effort packets and real-time packets to the MS bucket. The table is also illustrating a rescheduling of the best-effort packets as required according to an embodiment of the present invention. The conditions illustrated below for the best-effort class applies mutatis mutandis for other traffic classes that tolerate at least some buffering, packet delay and packet delay variations (e.g. the streaming class).

| Time | Bucket Counter before delivery | Bucket Counter after delivery | Event |
|---|---|---|---|
| 2.91 | 1635 | 1755 | sent VOIP package 1 |
| 3.00 | 1620 | 1620 | package 1500 was rescheduled to be sent when 120 byte has leaked out (3.08) |
| 3.01 | 1605 | 1725 | sent VOIP package 2 |
| 3.08 | 1620 | 1620 | package 1500 was rescheduled to be sent when 120 byte has leaked out (3.16) |
| 3.11 | 1575 | 1695 | sent VOIP package 3 |
| 3.16 | 1620 | 1620 | package 1500 was rescheduled to be sent when 120 byte has leaked out (3.24) |
| 3.21 | 1545 | 1665 | sent VOIP package 4 |
| 3.24 | 1620 | 1620 | package 1500 was rescheduled to be sent when 120 byte has leaked out (3.32) |
| 3.31 | 1515 | 1635 | sent VOIP package 5 |
| 3.32 | 1620 | 1620 | package 1500 was rescheduled to be sent when 120 byte has leaked out (3.40) |
| 3.40 | 1500 | 3000 | Package 1500 sent, next 1500 scheduled to 4.40 |
| 3.41 | 2985 | 3105 | sent VOIP package 6 |
| 3.51 | 2955 | 3075 | sent VOIP package 7 |
| 3.61 | 2925 | 3045 | sent VOIP package 8 |
| 3.71 | 2895 | 3015 | sent VOIP package 9 |
| 3.81 | 2865 | 2985 | sent VOIP package 10 |
| 3.91 | 2835 | 2955 | sent VOIP package 11 |
| 4.01 | 2805 | 2925 | sent VOIP package 12 |
| 4.11 | 2775 | 2895 | sent VOIP package 13 |
| 4.21 | 2745 | 2865 | sent VOIP package 14 |
| 4.31 | 2715 | 2835 | sent VOIP package 15 |
| 4.40 | 2700 | 2700 | package 1500 was rescheduled to be sent when 1200 byte has leaked out (5.20) |
| 4.41 | 2685 | 2805 | sent VOIP package 16 |
| 4.51 | 2655 | 2775 | sent VOIP package 17 |
| 4.61 | 2625 | 2745 | sent VOIP package 18 |
| 4.71 | 2595 | 2715 | sent VOIP package 19 |
| 4.81 | 2565 | 2685 | sent VOIP package 20 |
| 4.91 | 2535 | 2655 | sent VOIP package 21 |
| 5.01 | 2505 | 2625 | sent VOIP package 22 |
| 5.11 | 2475 | 2595 | sent VOIP package 23 |
| 5.20 | 2460 | 2460 | package 1500 was rescheduled to be sent when 960 byte has leaked out (5.84) |
| 5.21 | 2445 | 2565 | sent VOIP package 24 |
| 5.31 | 2415 | 2535 | sent VOIP package 25 |
| 5.41 | 2385 | 2505 | sent VOIP package 26 |

-continued

| Time | Bucket Counter before delivery | Bucket Counter after delivery | Event |
|------|-------------------------------|------------------------------|-------|
| 5.51 | 2355 | 2475 | sent VOIP package 27 |
| 5.61 | 2325 | 2445 | sent VOIP package 28 |
| 5.71 | 2295 | 2415 | sent VOIP package 29 |
| 5.81 | 2265 | 2385 | sent VOIP package 30 |
| 5.84 | 2340 | 2340 | package 1500 was rescheduled to be sent when 840 byte has leaked out (6.4) |
| 5.91 | 2235 | 2355 | sent VOIP package 31 |
| 6.01 | 2205 | 2325 | sent VOIP package 32 |
| 6.11 | 2175 | 2295 | sent VOIP package 33 |
| 6.21 | 2145 | 2265 | sent VOIP package 34 |
| 6.31 | 2115 | 2235 | sent VOIP package 35 |
| 6.40 | 2100 | 2100 | package 1500 was rescheduled to be sent when 600 byte has leaked out (6.8) |
| 6.41 | 2085 | 2205 | sent VOIP package 36 |
| 6.51 | 2055 | 2175 | sent VOIP package 37 |
| 6.61 | 2025 | 2145 | sent VOIP package 38 |
| 6.71 | 1995 | 2115 | sent VOIP package 39 |
| 6.80 | 1980 | 1980 | package 1500 was rescheduled to be sent when 480 byte has leaked out (7.12) |
| 6.81 | 1965 | 2085 | sent VOIP package 40 |
| 6.91 | 1935 | 2055 | sent VOIP package 41 |
| 7.01 | 1905 | 2025 | sent VOIP package 42 |
| 7.11 | 1875 | 1995 | sent VOIP package 43 |
| 7.12 | 1980 | 1980 | package 1500 was rescheduled to be sent when 480 byte has leaked out (7.44) |
| 7.21 | 1845 | 1965 | sent VOIP package 44 |
| 7.31 | 1815 | 1935 | sent VOIP package 45 |
| 7.41 | 1785 | 1905 | sent VOIP package 46 |
| 7.44 | 1860 | 1860 | package 1500 was rescheduled to be sent when 360 byte has leaked out (7.68) |
| 7.51 | 1755 | 1875 | sent VOIP package 47 |
| 7.61 | 1725 | 1845 | sent VOIP package 48 |
| 7.68 | 1740 | 1740 | package 1500 was rescheduled to be sent when 240 byte has leaked out (7.84) |
| 7.71 | 1695 | 1815 | sent VOIP package 49 |
| 7.81 | 1665 | 1785 | sent VOIP package 50 |
| 7.84 | 1740 | 1740 | package 1500 was rescheduled to be sent when 240 byte has leaked out (8.0) |
| 7.91 | 1635 | 1755 | sent VOIP package 51 |
| 8.00 | 1620 | 1620 | package 1500 was rescheduled to be sent when 120 byte has leaked out (8.08) |
| 8.01 | 1605 | 1725 | sent VOIP package 52 |
| 8.08 | 1620 | 1620 | package 1500 was rescheduled to be sent when 120 byte has leaked out (8.16) |
| 8.11 | 1575 | 1695 | sent VOIP package 53 |
| 8.16 | 1620 | 1620 | package 1500 was rescheduled to be sent when 120 byte has leaked out (8.24) |
| 8.21 | 1545 | 1665 | sent VOIP package 54 |
| 8.24 | 1620 | 1620 | package 1500 was rescheduled to be sent when 120 byte has leaked out (8.32) |
| 8.31 | 1515 | 1635 | sent VOIP package 55 |
| 8.32 | 1620 | 1620 | package 1500 was rescheduled to be sent when 120 byte has leaked out (8.40) |
| 8.40 | 1500 | 3000 | Package 1500 sent, next 1500 scheduled to 9.4 |
| 8.41 | 2985 | 3105 | sent VOIP package 56 |
| 8.51 | 2955 | 3075 | sent VOIP package 57 |

Figure 6:
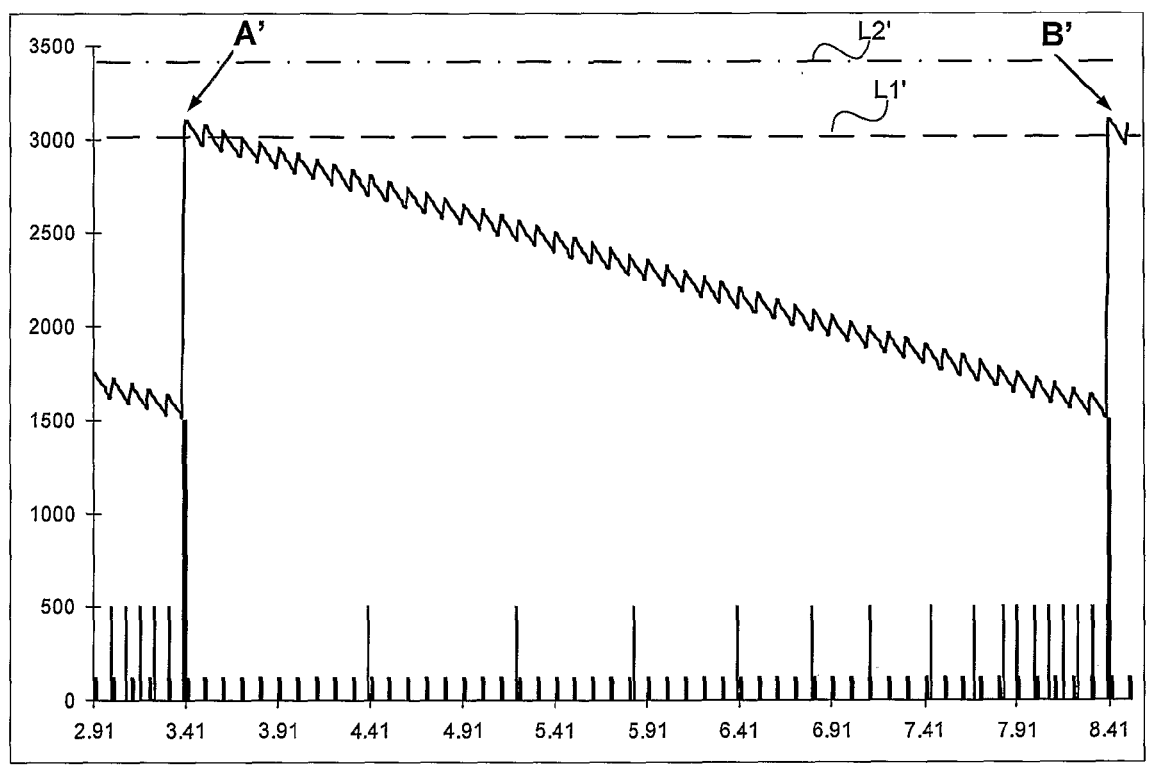
FIG. 6 is a diagram illustrating a transmission according to an embodiment of the present invention of a best-effort context (e.g. ftp) and a real-time context (e.g. VoIP) between two nodes in a packet switched network.
Figure 7A:
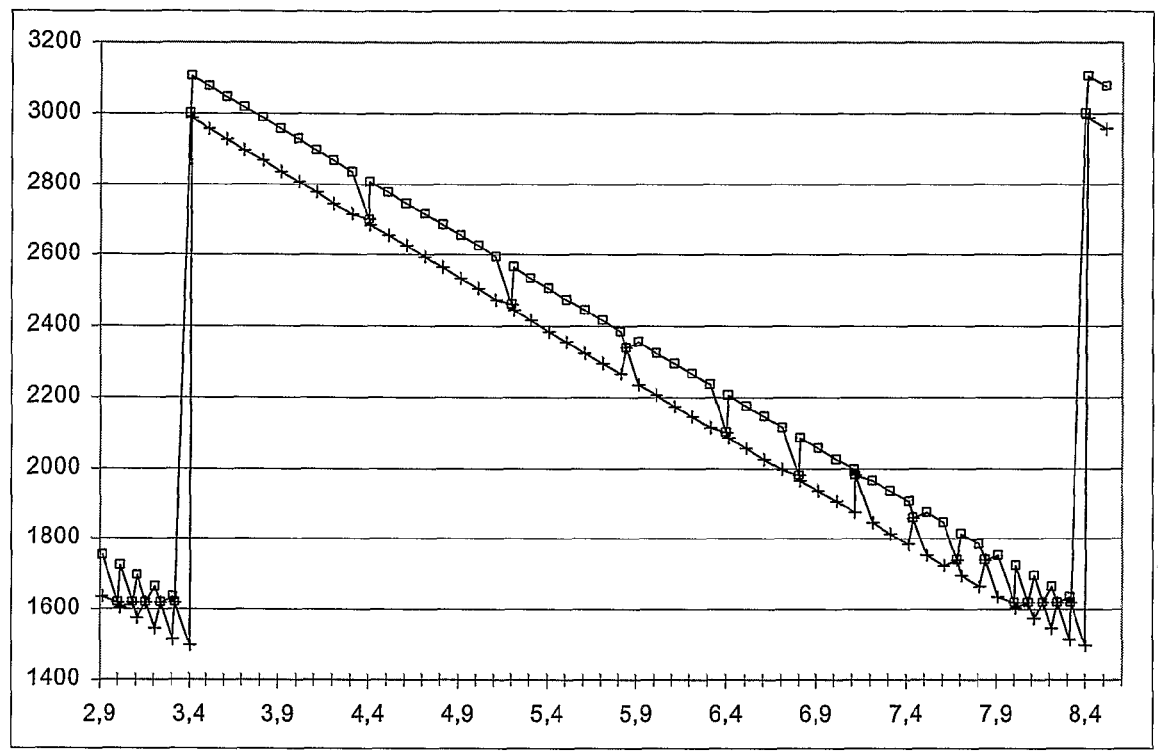
FIG. 7A is a diagram illustrating the same transmission as in FIG. 6, however in another way.
Figure 7B:
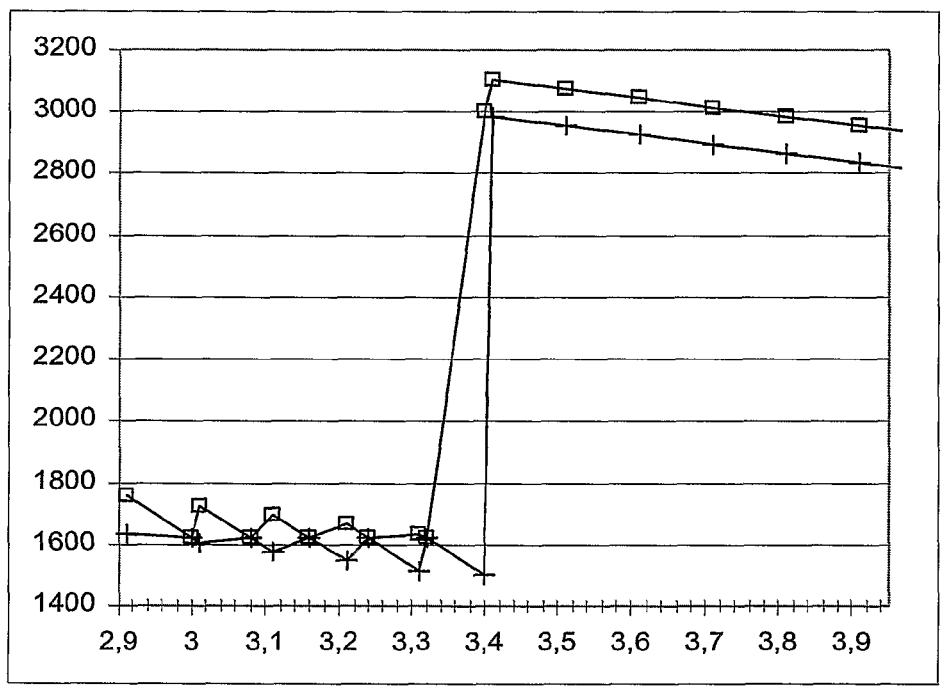
FIG. 7B is an enlargement of the beginning in diagram in FIG. 7A.
Figure 7C:
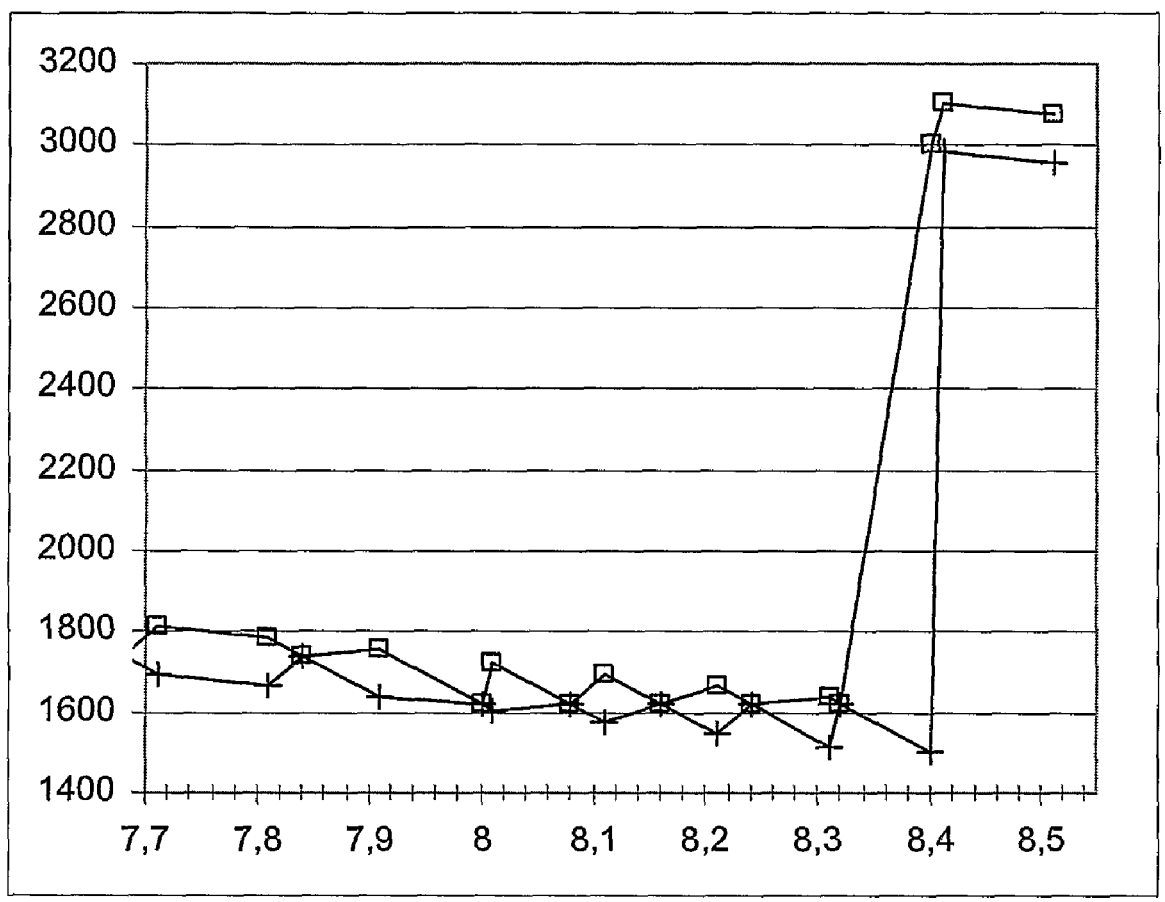
FIG. 7C is an enlargement of the end in diagram in FIG. 7A.

The values in the above table have been plotted in FIG. 6 illustrating a diagram wherein the X-axis represents time and the Y-axis represents number of bytes. The continuous serrated line represents the number of bytes in the MS bucket as reported by a bucket counter after the delivery of 1500 byte best-effort packets and 120 byte real-time packets. The vertical bars extending to 1500 byte represent the delivery of a 1500 byte best-effort packet to the MS bucket and the vertical bars extending to 120 byte represent the delivery of a 120 byte real-time packet to the MS bucket. The values in the above table have also been plotted in FIG. 7A illustrating a diagram wherein the X-axis represents time and the Y-axis represents the number of bytes currently present in the MS bucket. The continuous line provided with squares represents the number of bytes in the MS bucket as reported by a bucket counter after the delivery of 1500 byte best-effort packets and 120 byte real-time packets. The continuous line provided with crosses represents the number of bytes in the MS bucket as reported by a bucket counter before the delivery of 1500 byte best-effort packets and 120 byte real-time packets. FIGS. 7B and 7C are enlargements of the beginning and the end of the diagram in FIG. 7A.

As assumed above a 1500 byte best-effort packet was delivered to the MS bucket at 2.00 seconds. Considering the known leak rate of 1500 byte per second the next 1500 byte best-effort packet was scheduled by the SGSN for delivery to the MS bucket one second later, i.e. scheduled to be delivered to the MS bucket at 3.00 seconds.

However, at 3.00 seconds the real-time context that started at 2.91 seconds causes the bucket counter to indicate 1620 bytes and the 1500 byte best-effort packet cannot be delivered at 3.00 seconds without overflowing the bucket, since the bucket size for the best-effort packet was assumed to be set to 3000 byte. The best-effort packet is therefore rescheduled, based on the bucket counter value of 1620 bytes and the leak rate of 1500 bytes per second, to be delivered at 3.08 seconds (3000−1620=1380, 1500−1380=120; 120/1500=0.08 sec; 3.00+0.08=3.08). However, at 3.08 seconds the bucket counter indicates 1620 byte and the best-effort packet is rescheduled once again to be delivered at 3.16 seconds (3000−1620=1380, 1500−1380=120; 120/1500=0.08 sec; 3.08+0.08=3.16). Then again, at 3.16 seconds the bucket counter indicates 1620 bytes and the bucket is still to full. The best-effort packet is therefore rescheduled to be delivered at 3.24 seconds (3000−1620=1380, 1500−1380=120; 120/1500=0.08 sec; 3.16+0.08=3.24). The best-effort packet is rescheduled again at 3.24 seconds, and again at 3.32 seconds so as to finally be delivered to the MS bucket at 3.40 seconds.

The next 1500 byte best-effort packet waiting in the SGSN buffer is then scheduled to be delivered to the MS bucket one second later due to the known leak rate of 1500 byte per second, i.e. scheduled to be delivered to the MS bucket at 4.40 seconds. However, the real-time context causes the bucket counter to indicate 2700 bytes at 4.40 seconds and the 1500 byte best-effort packet can therefore not be delivered to the MS bucket at 4.40 seconds without overflowing the bucket, since the bucket size for best-effort packets is set to 3000 byte. The best-effort packet is therefore rescheduled in the same way or at least in a similar way as described above.

Rescheduling events have been schematically illustrated in FIG. 6 by vertical bars extending to 500 byte at 3.00, 3.08, 3.16, 3.24, 3.32, 4.40, 5.20, 5.91, 6.40, 6.80, 7.12, 7.44, 7.68, 7.84, 8.00, 8.08, 8.16, 8.24 and 8.32 seconds. In FIGS. 7-9 the rescheduling events are found in the points wherein the curve indicated by a square and the curve indicated by a cross assume the same value.

Let us now return to 3.40 seconds when a 1500 byte best-effort packet is delivered to the MS bucket. A moment later, i.e. at 3.41 seconds, the bucket counter indicates 2985 byte and then a 120 byte real-time packet arrives, i.e. VoIP packet 6 in the table above. Since the bucket size is set to 3000 byte for best-effort packets a delivery of this 120 byte real-time packet at 3.41 seconds would cause the bucket to overflow (2985+120=3105 byte). The overflow limit at 3000 bytes has been indicated by a dashed line L1' in FIG. 6, and the overflow point has been has been indicated by an arrow A' in FIG. 6. Since the real-time context requires an essentially circuit switched connection the real-time packet cannot be retransmitted or buffered and the packet should therefore be discharged. The same is valid for the following three real-time packets which also would cause the bucket to overflow if they were delivered, i.e. the VoIP packets 7-9 in the table above. The same or at least a very similar situation occurs when the bucket counter indicates 1500 byte at 8.40 seconds. Here a 1500 byte best-effort packet is sent to the MS bucket at 8.40 seconds and it is followed by the arrival of a 120 bytes real-time packet at 8.41 seconds. Since the delivery of the best-effort packet causes the bucket counter to indicate 3000 bytes a subsequent delivery of the 120 byte real-time packet at 8.41 seconds would cause the bucket to overflow (2985+120=3105 byte). This overflow point has been indicated in FIG. 6 by an arrow B'.

In other words, the buffering utilized above cannot handle situations wherein a real-time packet (e.g. a VoIP packet or similar) arrives a short time after the delivery of a best-effort packet or similar, at least not in situations wherein the bucket is operating near the full bucket limit (i.e. near 3000 bytes in the above example), However, according to the second embodiment of the invention the bucket size accommodating 3000 bytes of best-effort packets is increased by an amount that corresponds to at least one real-time packet of 120 bytes. This sets the MS bucket size to at least 2120 bytes (3000+120=2120).

The MS bucket size is preferably increased even further to ensure that a burst of subsequent real-time packets do not overflow the bucket. It is therefore preferred that the bucket size is increased to 3400 byte. The increased bucket size has been indicated in FIG. 6 by a dot-and-dashed line L2'. The increased bucket size can now accommodate the 120 bytes of real-time packets that would otherwise overflow the MS bucket at point A' and B' in FIG. 6.

The leak rate, the size of the packets, the time between two or several subsequent packets in a burst, the number of packets in a burst and the time between two successive burst are parameters that are preferably used to determine the bucket size for the best-effort packets and similar packets, and also a suitable increase of that bucket size to accommodate real-time packets in congestion situations. For example, the bucket leak rate must be equal to or greater than the send ratio or send rate of the real-time packets, i.e. the bucket leak rate of 1500 bytes per second must be greater than the average send rate of 1200 bytes per second in the example above.

In addition, knowing the leak rate (1500 bytes per sec) and the value of the bucket counter indicating the current number of bytes in the MS bucket enables the SGSN to reschedule a suitable time for delivery of a received and buffered best-effort packet without overflowing the bucket. For example, if the SGSN has buffered a best-effort packet (1500 bytes) for delivery to the MS bucket and the bucket counter indicates that there are 3000 byte in the MS bucket, then the SGSN can reschedule a delivery of the packet 1 second later (1500/1500=1 sec). A rescheduling of this kind has been discussed above with reference to the diagrams in FIGS. 6 and 7A-7C.

Alternatively a rescheduling can be accomplished by knowing and considering the send rate or send ratio and the bucket leak rate. In the example above we assumed that the real-time packets (i.e. VoIP packets) have a send ratio of 1200 bytes per second and that the bucket leak rate is 1500 bytes per second. If the MS bucket counter then indicates 3000 byte and a 1500 byte packet is waiting in the SGSN buffer to be delivered to the MS bucket it can be rescheduled to be delivered 5 seconds later (3000−1500=1500 must leak out, which takes 1500/(1500−1200)=5 sec), i.e. the leak-rate can be perceived as reduced by 1200 bytes per second for the best-effort bytes.

The parameter "bucket full ratio" mentioned above in connection with a GPRS network comprises a measure of the number of bytes actually received by the buffer 41 in the BSS (BSC). The SGSN should normally comply with this value by correcting the bucket counter calculated by the leaky-bucket algorithm. However, the "bucket full ratio" is per definition not reflecting the true number of bytes received and buffered in the BSS (BSC), at least not the time the SGSN receives this message. This is i.a. due to transmission delay between the SGSN and the BSS and to the fact that there is always packets on their way to the BSS which are not reflected by the "bucket full ratio". A preferred embodiment of the leaky-bucket algorithm according to the present invention is therefore ignoring messages from the BSS (BSC) node regarding the number of bytes actually received if the number of bytes exceeds the bucket size for best-effort or other buffered packets as long as it does not exceed the increased bucket size for real-time packets.

In other words, the SGSN will preferably pay no attention to the value of the "bucket full ratio" or a similar value indicating the number of bytes buffered in the buffer 41 at the BSS (BSC) on the BVC and MS bucket level if the "bucket full ratio" indicates that the number of received and buffered packets in the BSS (BVC) buffer 41 is above the bucket size for buffered packets as long as it is below the bucket size for real-time packets. The MS bucket size in the example above was set to 3000 bytes for best-effort packets or similar buffered packets and at least to 3120 byte and more preferably to 3400 byte for real time packets In other words, the leaky-bucket algorithm applies a hysteresis of e.g. 400 bytes near the upper bucket limit.

The invention claimed is:

1. A bucket method for delivering packets from a first node to a second node in a packet switched network, comprising the steps of:
   receiving at the first node at least one transmission comprising best effort packets and at least one transmission comprising real-time packets;
   transmitting the received packets to the second node and increasing a bucket counter for a bucket in the first node by delivering said packets to the bucket, which bucket has a bucket leak rate that is equal to or larger than a byte transmitting ratio of the real-time packets;
   wherein:
   a bucket size for the best-effort packets in said bucket is set to a first size;
   a bucket size for real-time packets in said bucket is set to a second size that is larger than the first bucket size to allow additional capacity solely for the real-time packets to be used in case of a burst of subsequent real-time packets;
   the real-time packets are transmitted to the second node upon arrival at the first node, provided that the bucket counter indicates that the second bucket size is not overflowed; and,
   the best-effort packets are scheduled to be transmitted to the second node depending on the bucket leak rate and rescheduled after a failed delivery to the bucket due to the risk of overflowing the first bucket size in said bucket to allow a full capacity to be allocated for transmitting the real-time packets if needed while the best-effort packets are discharged or buffered for a later delivery to the bucket.

2. The bucket method according to claim 1, wherein:
   the second bucket size is set to be at least one real-time packet larger than the first bucket size.

3. The bucket method according to claim 1, wherein:
   the best-effort packets are scheduled to be transmitted to the second node depending on the bucket leak rate reduced by the byte transmitting ratio of the real-time packets.

4. The bucket method according to claim 1, wherein:
   the first node receives a measure from the second node, which measure comprises a number of bytes received by the second node; and,
   the first node corrects the bucket counter according to this number, provided that the number of bytes is below the first bucket size or above the second bucket size, thereby creating an hysteresis for adjusting the bucket counter in the leaky-bucket method.

5. The bucket method according to claim 1, wherein:
   the packet switched network is a General Packet Radio Service (GPRS) network and the first node is a Serving GPRS Support Node (SGSN) and the second node is at least one of a Base station Sub-System (BSS), a Base Station Controller (BSC) or a Radio Network Controller (RNC).

6. The bucket method according to claim 1, wherein:
   the real-time packets are Voice over IP (VoIP) packets.

7. A first node arranged to perform a bucket method for delivering packets from the first node to a second node in a packet switched network, said first node adapted to:
   receive at least one transmission comprising best-effort packets and at least one transmission comprising real-time packets;
   transmit the received packets to the second node and increase a bucket counter for a bucket by delivering said packets to the bucket, which bucket has a bucket leak rate that is equal to or larger than a byte transmitting ratio of the real-time packets;
   wherein:
   a bucket size for the best-effort packets in said bucket is set to a first size;
   a bucket size for real-time packets in said bucket is set to a second size that is larger than the first bucket size to allow additional capacity solely for the real-time packets to be used in case of a burst of subsequent real-time packets;
   the real-time packets are transmitted to the second node upon arrival at the first node, provided that a bucket counter indicates that the second bucket size is not overflowed; and,
   best-effort packets are scheduled to be transmitted to the second node depending on the bucket leak rate and rescheduled after a failed delivery to the bucket due to the risk of overflowing the first bucket size due to the risk of overflowing the first bucket size in said bucket to allow a full capacity to be allocated for transmitting the real-time packets if needed while the best-effort packets are discharged or buffered for a later delivery to the bucket.

8. The first node according to claim 7, wherein:
   the second bucket size is set to be at least one real-time packet larger than the first bucket size.

9. The first node according to claim 7, wherein:
   the best-effort packets are scheduled to be transmitted to the second node depending on the bucket leak rate reduced by the byte transmitting ratio of the real-time packets.

10. The first node according to claim 7, wherein:
    the first node is arranged to receive a measure from the second node, which measure comprises a number of bytes received by the second node; and,
    the first node is arranged to correct the bucket counter according to this number, provided that the number of bytes is below the first bucket size or above the second bucket size, thereby creating an hysteresis for adjusting the bucket counter in the leaky-bucket method.

11. The first node according to claim 7, wherein:
    the packet switched net is a General Packet Radio Service (GPRS) network and the first node is a Serving GPRS Support Node (SGSN) and the second node is at least one of a Base station Sub-System (BSS), a Base Station Controller (BSC) or a Radio Network Controller (RNC).

12. The first node according to claim 7, wherein:
    the real-time packets are Voice over IP (VoIP) packets.

* * * * *

UNITED STATES PATENT AND TRADEMARK OFFICE
CERTIFICATE OF CORRECTION

| | |
|---|---|
| PATENT NO. | : 7,864,684 B2 |
| APPLICATION NO. | : 12/159725 |
| DATED | : January 4, 2011 |
| INVENTOR(S) | : Onbeck |

It is certified that error appears in the above-identified patent and that said Letters Patent is hereby corrected as shown below:

On the Face Page, in Field (56), under "OTHER PUBLICATIONS", in Column 2, Line 3, delete "Seivice" and insert -- Service --, therefor.

In Column 3, Lines 26-27, delete "overflowed." and insert -- overflowed, --, therefor.

In Column 3, Line 56, delete "an" and insert -- a --, therefor.

In Column 3, Line 58, delete "(UMTS-system)" and insert -- (UMTS-system), --, therefor.

In Column 4, Line 20, delete "overflowed." and insert -- overflowed, --, therefor.

In Column 4, Line 67, delete "architecture" and insert -- architecture. --, therefor.

In Column 11, Line 20, delete "refereed" and insert -- referred --, therefor.

In Column 11, Line 66, delete "on:" and insert -- on --, therefor.

In Column 12, Line 26, delete "down link" and insert -- downlink --, therefor.

In Columns 13-14 & 15-16, in the Table, delete "VOIP" and insert -- VoIP --, therefor at each occurrence.

In Column 17, Line 54, delete "example)," and insert -- example). --, therefor.

In Column 18, Line 46, delete "is" and insert -- are --, therefor.

In Column 20, Lines 27-28, in Claim 7, delete the repeated text "due to the risk of overflowing the first bucket size".

Signed and Sealed this
Third Day of May, 2011

David J. Kappos
*Director of the United States Patent and Trademark Office*

CERTIFICATE OF CORRECTION (continued)
U.S. Pat. No. 7,864,684 B2

In Column 20, Line 51, in Claim 11, delete "net" and insert -- network --, therefor.